US010071339B2

(12) United States Patent
Weiss et al.

(10) Patent No.: US 10,071,339 B2
(45) Date of Patent: Sep. 11, 2018

(54) PROCESS FOR PURIFYING GASEOUS MIXTURES CONTAINING ACIDIC GASES

(71) Applicant: TOTAL S.A., Courbevoie (FR)

(72) Inventors: Claire Weiss, Vaucresson (FR);
Renaud Cadours, Francheville (FR);
Jing Zhao, Courbevoie (FR);
Virenkumar Shah, Cruden Bay (GB)

(73) Assignee: Total SA, Courbevoie (FR)

( * ) Notice: Subject to any disclaimer, the term of this patent is extended or adjusted under 35 U.S.C. 154(b) by 185 days.

(21) Appl. No.: 14/402,559

(22) PCT Filed: May 23, 2013

(86) PCT No.: PCT/EP2013/060586
§ 371 (c)(1),
(2) Date: Nov. 20, 2014

(87) PCT Pub. No.: WO2013/174907
PCT Pub. Date: Nov. 28, 2013

(65) Prior Publication Data
US 2015/0139877 A1 May 21, 2015

(30) Foreign Application Priority Data

May 25, 2012 (FR) ..................... 12 54844

(51) Int. Cl.
| | | |
|---|---|---|
| B01D 53/14 | (2006.01) | |
| B01D 53/52 | (2006.01) | |
| C10L 3/10 | (2006.01) | |
| C10L 3/12 | (2006.01) | |

(52) U.S. Cl.
CPC ..... *B01D 53/1493* (2013.01); *B01D 53/1425* (2013.01); *B01D 53/1462* (2013.01); *C10L 3/102* (2013.01); *C10L 3/103* (2013.01); *C10L 3/104* (2013.01); *C10L 3/12* (2013.01); *B01D 2252/103* (2013.01); *B01D 2252/2023* (2013.01); *B01D 2252/2056* (2013.01); *B01D 2252/20431* (2013.01); *B01D 2252/20447* (2013.01); *B01D 2252/20489* (2013.01); *B01D 2252/504* (2013.01); *B01D 2252/602* (2013.01); *B01D 2257/306* (2013.01); *B01D 2257/308* (2013.01); *C10L 2290/541* (2013.01)

(58) Field of Classification Search
None
See application file for complete search history.

(56) References Cited

U.S. PATENT DOCUMENTS

| | | |
|---|---|---|
| 3,864,460 A | 2/1975 | Connell |
| 4,276,057 A | 6/1981 | Becker et al. |
| 4,336,233 A | 6/1982 | Appl et al. |
| 4,370,156 A | 1/1983 | Goddin, Jr. et al. |
| 4,519,991 A | 5/1985 | Oliveau et al. |
| 4,545,965 A | 10/1985 | Gazzi et al. |
| 5,209,914 A | 5/1993 | Peytavy et al. |
| 5,277,885 A | 1/1994 | Peytavy et al. |
| 5,348,714 A | 9/1994 | Peytavy et al. |
| 6,852,144 B1 | 2/2005 | Wagner et al. |
| 7,374,734 B2 | 5/2008 | Grossman et al. |
| 8,287,626 B2 | 10/2012 | Hoang-Dinh et al. |
| 8,419,832 B2 | 4/2013 | Capdeville et al. |
| 8,821,615 B2 | 9/2014 | Weiss et al. |
| 2008/0025893 A1 | 1/2008 | Asprion et al. |
| 2010/0154637 A1 | 6/2010 | Capdeville |
| 2010/0288125 A1 | 11/2010 | Vorberg et al. |
| 2012/0240617 A1 | 9/2012 | Weiss et al. |

FOREIGN PATENT DOCUMENTS

| | | |
|---|---|---|
| GB | 1554594 A | 10/1979 |
| WO | WO-8701961 A1 | 4/1987 |
| WO | WO-2004071624 A1 | 8/2004 |
| WO | WO-2009156622 A1 | 12/2009 |
| WO | WO-2010/150227 A1 | 12/2010 |

OTHER PUBLICATIONS

PC/EP2013/060578, filed May 23, 2013, Claire Weiss, Renaud Cadours, Jing Zhao, Virenkumar Shah, Serge Capdeville.
U.S. Appl. No. 15/662,518, filed Jul. 28, 2017, Claire Weiss et al.
Attari et al., "Sampling and Analysis of Natural Gas Trace Constituents." Institute of Gas Technology, Sep. 1, 1993.

*Primary Examiner* — Daniel Berns
(74) *Attorney, Agent, or Firm* — Harness, Dickey & Pierce, PLC

(57) ABSTRACT

A process is disclosed for purifying a gaseous mixture containing acidic gases, such as a natural gas, including contacting the gaseous mixture with an absorbent solution including:

from 35% to 45% by weight of at least one tertiary amine relative to the total weight of the absorbent solution;

from 4% to 12% by weight of at least one activator relative to the total weight of the absorbent solution selected from the primary amines and the secondary amines, the total content of tertiary amine and activator being from 38% to 50% by weight relative to the total weight of the absorbent solution, and the total concentration of tertiary amine and activator being between 3.8 and 4.2 mol/L;

from 17% to 25% by weight of at least one $C_2$ to $C_4$ thioalkanol relative to the total weight of the absorbent solution;

and the remainder being water to reach 100% by weight.

19 Claims, No Drawings

PROCESS FOR PURIFYING GASEOUS MIXTURES CONTAINING ACIDIC GASES

CROSS-REFERENCE TO RELATED APPLICATIONS

This application is a National Phase Entry of International Application No. PCT/EP2013/060586, filed on May 23, 2013, which claims priority to French Patent Application Serial No. 1254844, filed May 25, 2012, both of which are incorporated by reference herein.

BACKGROUND AND SUMMARY

The present invention relates to a process for purifying gaseous mixtures. Moreover, the present invention applies to the treatment of liquid hydrocarbon mixtures containing acidic compounds and other sulphur-containing compounds such as the mercaptans and COS. The present invention further relates to an absorbent solution for the implementation of this process.

The invention in particular finds its application in the oil and gas industry. The invention applies in particular to the removal of acidic gases from natural gases. In fact, acidic natural gases represent about 40% of the remaining gas reserves in the world and the specifications relating to the sulphur content of these gases are more and more serious.

The purification of gaseous mixtures, and in particular of hydrocarbon gaseous mixtures such as natural gas, which consists primarily of methane, or of synthesis gas, in order to remove contaminants and impurities from them is a common operation in industry. These impurities and contaminants are in particular the "acidic gases" such as for example carbon dioxide ($CO_2$) and hydrogen sulphide ($H_2S$); sulphur-containing compounds other than hydrogen sulphide ($H_2S$) such as for example carbonyl sulphide (COS) and the mercaptans (R—SH, where R is an alkyl group); water, and certain hydrocarbons. Carbon dioxide and hydrogen sulphide can represent a large proportion of the gaseous mixture from a natural-gas deposit, typically from 3% to 70% by volume, whereas COS is present in much smaller quantities, typically ranging from 1 to 100 ppm by volume, and the mercaptans are present at a content generally below 1000 ppm by volume, for example at a content comprised between 5 ppm by volume and 500 ppm by volume.

Contaminants that must be removed also include the mercaptans. The total quantity of mercaptans in a gaseous mixture originating from a natural gas production site can represent several hundreds of ppm by volume. The two principal mercaptans involved are methyl mercaptan and ethyl mercaptan, but other mercaptans, and in particular the molecules of the type $C_3SH$ to $C_6SH$ can be present, generally at lower concentration.

The natural gas obtained from a deposit thus undergoes several treatments in order to comply with specifications which are in particular dictated by commercial constraints, transport constraints or constraints connected with safety. These treatments are in particular treatments of deacidification, dehydration, and gasoline stripping. This last-mentioned treatment consists of separating ethane, propane, butane and gasolines, forming liquefied petroleum gas ("LPG"), from the methane gas which is sent to the distribution system.

The specifications on the content of acidic gases in the treated gas (originating from the treatment) are specific to each of the considered products. Thus, the contents of a few ppm are imposed for $H_2S$ or the other sulphur-containing compounds, whereas the specifications for $CO_2$ are comprised between several ppm if a liquefaction step for producing liquefied natural gas is provided downstream of the purification process, and a few percent, generally 2%. Similar problems are encountered for the deacidification of liquid hydrocarbon mixtures and in particular liquid hydrocarbon cuts, obtained in the steps of gasoline stripping natural gas, or in the fractionation of crudes in the applications connected with petroleum refining or other of liquid hydrocarbons mixtures.

Numerous processes currently exist for successively or simultaneously removing the acidic gases and other sulphur-containing compounds from gaseous mixtures. Taking into account the specific properties of each of the products to be removed, these processes generally comprise several different successive steps in order to reach all the requirements of the specifications.

Thus, carbon dioxide $CO_2$ and hydrogen sulphide $H_2S$ are generally removed in a step using a water-alkanolamine absorbent solution, whereas the other sulphur-containing compounds, such as the mercaptans or COS, are removed during steps using dedicated processes such as an absorption on a molecular sieve or a scrubbing with soda. The water-alkanolamine absorbent solutions were optimized in the past during the development of processes for the removal of hydrogen sulphide and carbon dioxide. These processes are now well known and widely used.

Initially, primary or secondary alkanolamines were used for the treatment of laden gaseous or liquid hydrocarbon streams with acidic gases. Among these alkanolamines, there may be mentioned in particular: MonoEthanolAmine (MEA, 2-aminoethanol), DiEthanolAmine (DEA, N,N-bis (2-hydroxyethyl)amine), DiIsoPropanolAmine (DIPA, N,N-bis(2-hydroxypropyl)amine) and 2-aminoethoxyethanol (AEE).

Energy constraints as well as constraints connected with the processes then led the operators to improve these processes, by optimizing the absorbent solutions, for example by using MethylDiethanolAmine (MDEA) for the selective removal of $H_2S$, then mixtures of MDEA and primary or secondary alkanolamines for controlling the quantity of $CO_2$ absorbed. These optimized absorbent solutions can in particular comprise a tertiary amine and an activator.

Examples of these absorbent solutions are given in the following documents:

U.S. Patent Publication No. 2008/0025893 relates to a process for removing $CO_2$ from a gaseous stream, in which the said gaseous stream is contacted with a liquid absorbent selected from an aqueous solution of an amino compound with at least two tertiary amine groups in their molecule and an activator selected from the primary and secondary amines; or an aqueous solution of a tertiary aliphatic amine and an activator selected from 3-methylaminopropylamine, piperazine, 2-methylpiperazine, N-methylpiperazine (NMP), homopiperazine, piperidine, and morpholine (MO).

U.S. Pat. No. 7,374,734 (WO-A1-2004/071624) describes a process for removing the acidic gases from a fluid, in which the said fluid is contacted with an aqueous absorbent comprising at least one tertiary alkanolamine in particular selected from methyldiethanolamine (MDEA), triethanolamine (TEA), ethyldiethanolamine or diethanolamine (DEA); an amine selected from hydroxyethylpiperazine (HEP) or a mixture of the latter with bis(hydroxyethylpiperazine); and piperazine.

U.S. Pat. No. 6,852,144 relates to a process for selectively removing COS relative to $CO_2$ in a stream of a hydrocarbon fluid which contains $CO_2$ and COS, in which the hydrocarbon fluid is contacted with a scrubbing liquid constituted by an aqueous amine solution containing an aliphatic alkanolamine having from 2 to 12 carbon atoms, preferably a tertiary alkanolamine such as methyldiethanolamine (MDEA) or triethanolamine (TEA); and an activator selected from piperazine, methyl piperazine, and morpholine (MO).

U.S. Pat. Nos. 5,209,914, 5,277,885 and 5,348,714 relate to a process of $CO_2$ absorption in a gas, in which the said gas is contacted with an absorbent liquid, which is generally in the form of an aqueous solution of one or more alkanolamines such as MDEA and an activator which improves the absorption of $CO_2$ by the said alkanolamines.

The activator can in particular be selected from the polyamines such as dipropylenetriamine (DPTA), diethylenetriamine (DETA), triethylenetetramine (TETA) and tetraethylenepentamine (TEPA); aminoethylethanolamine (AEEA), hexamethylenediamine (HMDA), dimethylaminopropylamine (DMAPA) and diaminocyclohexane (DACH). Other suitable compounds as activators are methoxypropylamine (MOPA), ethoxypropylamine, aminoethyl piperazine (AEPZ), aminopropyl piperazine, aminoethyl piperidine (AEPD), aminopropyl piperidine, furfurylamine (FA), and ethylmonoethanolamine (EMEA). However, the optimized absorbent solutions are always constituted by water-alkanolamine mixtures.

The processes which use absorbent solutions constituted by water-alkanolamine mixtures have the drawback to be limited to the absorption of carbon dioxide and hydrogen sulphide, and their performance as regards to the removal of the other sulphur-containing compounds such as the mercaptans remains minimal. The other sulphur-containing compounds must therefore be removed in additional steps. For example, a step using molecular sieves makes it possible to remove the mercaptans.

In order to simplify the treatment of gaseous mixtures containing acidic gases, another solution therefore consists of using a hybrid solvent, composed of water, alkanolamine, and an organic compound allowing to solubilize in the solvent, the sulphur-containing compounds, such as the mercaptans. The aim of the processes which use these hybrid solvents, is to remove simultaneously of $CO_2$, $H_2S$, and the other sulphur-containing compounds, such as the mercaptans and COS. These processes use for example sulpholane or methanol as organic compound performing the role of cosolvent.

However, it should be noted, that these processes suffer from a severe penalty owing to the nature of the retained organic compound. In fact, sulpholane leads to considerable coabsorption of hydrocarbons, which causes many problems both with regard to the operation of the sulphur production plants located downstream, and with regard to the quality of the products obtained from these plants. The application of methanol as cosolvent leads to significant losses of alcohol.

Another process for the simultaneous removal of the acidic gases and mercaptans was the subject of the application WO-A1-2007/083012 (FR-A1-2896244), which describes a process for purifying a gaseous mixture containing acidic gases comprising a step of contacting said gaseous mixture with an absorbent solution comprising an alkanolamine, a $C_2$-$C_4$ thioalkanol, and water. The preferred alkanolamine is diethanolamine (DEA), and the preferred thiodiglycol is thiodiglycol (TDG). However, the energy efficiency of the process described in the document WO-A1-2007/083012 (FR-A1-2896244) is still insufficient and needs to be improved. Moreover, this process cannot be adapted easily to the composition of the treated feedstock and/or the specifications to be met as regards to the contents of each of the compounds to be removed. In other words, its flexibility is low.

Therefore, in view of the foregoing, there is a need for a process which provides, in a single step, a simultaneous removal of the acidic gases and other sulphur-containing compounds from a gaseous mixture, which ensures an energy saving relative to the processes of the prior art such as the process described in document WO-A1-2007/083012, and which can easily be adapted so that it is suitable for treating gaseous mixtures of various compositions and complying a wide range of specifications as to the final contents of acidic gases and other sulphur-containing compounds to be obtained. The aim of the present invention is to provide a process for purifying a gaseous mixture containing acidic gases which meets these needs, among others. The aim of the present invention is also to provide such a process which does not have the drawbacks, shortcomings, limitations and disadvantages of the processes of the prior art, and which provides a solution to the problems of the processes of the prior art.

DETAILED DESCRIPTION

This aim, and others, are achieved according to the invention by a process for purifying a gaseous mixture containing at least one acidic gas selected from hydrogen sulphide $H_2S$ and carbon dioxide $CO_2$, comprising a step of contacting said gaseous mixture with an absorbent solution comprising, preferably constituted by:

from 35% to 45% by weight of at least one tertiary amine relative to the total weight of the absorbent solution;

from 4% to 12% by weight of at least one activator relative to the total weight of the absorbent solution; the total content of tertiary amine and activator being from 38% by weight to 50% by weight relative to the total weight of the absorbent solution, and the total concentration of tertiary amine and activator being comprised between 3.8 and 4.2 mol/L;

from 17% to 25% by weight of at least one $C_2$ to $C_4$ thioalkanol relative to the total weight of the absorbent solution;

the remainder being water to reach 100% by weight.

The activator is preferably selected from the primary amines and the secondary amines, more preferably from the primary alkanolamines and the secondary alkanolamines.

The process according to the invention differs fundamentally from the processes according to the prior art in that it uses a novel absorbent solution which has never been described in the prior art. This absorbent solution comprises specific components in specific quantities. Thus, the absorbent solution used in the process according to the invention differs from the absorbent solutions constituted by water-alkanolamine mixtures in that it further comprises a $C_2$ to $C_4$ thioalkanol in a specific proportion, namely from 17% by weight to 25% by weight relative to the total weight of the absorbent solution.

Moreover, the absorbent solution used in the process according to the invention differs fundamentally from the absorbent solution comprising an alkanolamine, a $C_2$-$C_4$ thioalkanol, and water used in the process described in document WO-A1-2007/083012 (FR-A1-2896244). In fact, the absorbent solution used in the process according to the invention advantageously comprises a mixture of specific amines, namely a mixture of at least one tertiary amine and at least one primary or secondary amine performing the role of activator. Each of these amines, tertiary on the one hand, and primary or secondary on the other hand, is present respectively in a specific quantity, defined by a narrow range, and the mixture of these amines is also present in a specific quantity, also defined by a narrow range. The other constituents of the mixture, namely water and $C_2$-$C_4$ thioalkanol, are also present in specific quantities, defined by narrow ranges.

The process for purifying a gaseous mixture containing acidic gases according to the invention meets the needs mentioned above, it does not have the drawbacks, shortcomings, limitations and disadvantages of the processes of the prior art, and it provides a solution to the problems of the processes of the prior art. Owing to the specific absorbent solution that it uses, the process according to the invention, allows astonishingly a simultaneous removal, and advantageously in a single step, not only of all the acidic gases i.e. hydrogen sulphide and carbon dioxide, but also of the other sulphur-containing compounds such as the mercaptans and COS, whereas the processes of the prior art also require several other treatment steps for all the acidic gases and all the other sulphur-containing compounds to be removed. In fact, in these processes of the prior art, as shown above, the removal of the acidic gases $CO_2$ and $H_2S$ is generally carried out by means of a water-alkanolamine absorbent solution, using for example diethanolamine, methyldiethanolamine or a methyldiethanolamine-secondary amine mixture, for example HEP (hydroxyethyl piperazine) or piperazine.

The processes using these water-alkanolamine absorbent solutions are effective for removing $CO_2$ and $H_2S$, but do not allow to remove other sulphur-containing compounds such as the mercaptans, and it is then necessary to use an additional step, for example with molecular sieves in order to remove the mercaptans. The process according to the invention has the advantage to remove all the acidic gases and all the other sulphur-containing compounds during the step of absorption or contacting the gaseous mixture with the absorbent solution. The process according to the invention makes it possible to remove simultaneously, not only $CO_2$ and $H_2S$, but also the other sulphur-containing compounds such as the mercaptans and COS, thus generally making it possible to avoid an additional step, in addition to the step of contacting, for the removal of mercaptans or COS.

Owing to the specific absorbent solution that it uses, the process according to the invention gives a considerable energy saving relative to the processes of the prior art which use a water-alkanolamine absorbent solution (see examples), but also relative to the process described in document WO-A1-2007/083012 (FR-A1-2896244). The process according to the invention makes it possible to reduce the capital costs ("CAPEX") and operating costs ("OPEX") of the installations for treating gases and in particular natural gas owing to the energy savings resulting from the optimization of the absorbent solution used, and from the reduction in the size of the installations provided downstream for the removal of the other sulphur-containing compounds such as the mercaptans or even from the elimination some of these installations (see examples). Another advantage of the process according to the invention is the high stability of the absorbent solution used.

Another essential advantage of the process according to the invention is its high flexibility. In fact, the process according to the invention can be adapted very easily depending on the composition of the gaseous mixture to be treated and/or the specifications to be met for each of the acidic gases and each of the other sulphur-containing compounds in the gaseous mixture originating from the treatment. In particular, for this it is sufficient to modify the relative proportions of the tertiary amine and of the activator in the absorbent solution. By way of example, a higher proportion of activator will provide more reactivity and will give a purified mixture containing less $CO_2$ whereas a lower proportion of activator will provide less reactivity and will give a purified mixture containing more $CO_2$.

The gaseous mixture to be treated by the process according to the invention can be any gaseous mixture containing at least one acidic gas selected from hydrogen sulphide $H_2S$ and carbon dioxide $CO_2$. Generally, this gaseous mixture can contain, besides the said at least one acidic gas, for example besides $H_2S$ and $CO_2$, at least one sulphur-containing compound different from hydrogen sulphide $H_2S$. The said, at least one sulphur-containing compound different from hydrogen sulphide $H_2S$ can preferably be selected from the mercaptans and carbonyl sulphide COS. Preferably, the mercaptans which have the formula R—SH (where R is an alkyl radical comprising for example from 1 to 10 carbon atoms, in particular from 1 to 6 carbon atoms) comprise methyl mercaptan and ethyl mercaptan, but other mercaptans, and in particular the molecules of type $C_3SH$ to $C_6SH$ can be present, generally at lower concentrations than the methyl mercaptan and ethyl mercaptan.

The hydrogen sulphide content of the gaseous mixture to be treated is generally from 40 ppm to 40% by volume, and after the contacting step this content can be lowered to 1 ppm by volume. The $CO_2$ content of the gaseous mixture to be treated is generally from 0.2% by weight to 40% by volume, and after the contacting step this content can be lowered to 50 ppm by volume. The content of the mercaptans in the gaseous mixture to be treated is generally from 10 ppm to 1000 ppm by volume, and after the contacting step this content can be lowered to 1 ppm by volume. The COS content of the gaseous mixture to be treated is generally from 5 ppm to 100 ppm by volume, and after the contacting step this content can be lowered to 2 ppm by volume.

Gaseous mixtures that contain acidic gases are for example natural gas, synthesis gas, cracked gas, coke-oven gas, gas resulting from coal gasification, landfill gas, biogas, flue gases, and the gases obtained in the gas treatment plants of a refinery. The gaseous mixture can be a hydrogenated gaseous mixture, i.e. it contains as principal component hydrogen, or hydrogen and carbon dioxide or hydrogen and carbon monoxide. Preferably, the gaseous mixture is a hydrocarbon gaseous mixture, i.e. it contains one or more hydrocarbons as principal component.

These hydrocarbons are for example saturated hydrocarbons such as C1-C4 alkanes such as methane, ethane, propane and butane, unsaturated hydrocarbons such as ethylene or propylene, or aromatic hydrocarbons such as benzene, toluene or xylene. The said, hydrocarbon gaseous mixture can be selected from natural gases, tail gases obtained at the outlet of the sulphur chains (CLAUS unit), and the gases obtained in the gas treatment plants ("gas plant") of a refinery. Natural gases have very variable pressures, which can range for example from 10 to 100 bar, and temperatures that can range from 20° C. to 60° C.

The $CO_2$ and $H_2S$ contents of natural gases are also very variable. They can be up to 15% by volume for each of these two compounds and can even be up to 40% by volume.

The tail gases obtained at the outlet of the sulphur chains, or the feed gases of the $H_2S$ enrichment units located upstream of the CLAUS processes, generally have a very low pressure, for example below 3 bar, most often below 2 bar, and the temperatures of these gases are generally comprised between 40° C. and 70° C. The $H_2S$ contents of these tail gases are generally below 5% by volume, and often below 2% by volume. In contrast, the $CO_2$ contents of these tail gases are variable and can reach 80% by volume.

The present invention can also apply to the treatment of mixtures, or of liquid hydrocarbon feedstocks. There is no limitation regarding to the tertiary amine of the absorbent solution used in the process according to the invention. However, the tertiary amine used must generally be water-soluble at the concentrations used in the absorbent solution.

This amine can be for example aliphatic, cyclic or aromatic. Preferably, the tertiary amine is selected from the tertiary alkanolamines. It may be reminded that the alkanolamines or amino alcohols are amines comprising at least one hydroxyalkyl group (comprising for example from 1 to 10 carbon atoms) bound to the nitrogen atom.

The tertiary alkanolamines can be trialkanolamines, alkyldialkanolamines or dialkylalkanolamines. The alkyl groups and the hydroxyalkyl groups can be linear or branched and generally comprise from 1 to 10 carbon atoms, preferably the alkyl groups comprise from 1 to 4 carbon atoms, and the hydroxyalkyl groups comprise from 2 to 4 carbon atoms.

Examples of tertiary amines and in particular of tertiary alkanolamines are given in U.S. Patent Publication No. 2008/0025893, the description of which can be referred to. It is in particular N-methyldiethanolamine (MDEA), N,N-diethylethanolamine (DEEA), N,N-dimethylethanolamine (DMEA), 2-diisopropylaminoethanol (DIEA), N,N,N',N'-tetramethylpropanediamine (TMPDA), N,N,N',N'-tetraethylpropanediamine (TEPDA), dimethylamino-2-dimethylamino-ethoxyethane (Niax), and N,N-dimethyl-N',N'-diethylethylenediamine (DMDEEDA).

Examples of tertiary alkanolamines that can be used in the process according to the invention are also given in U.S. Patent Publication No. 2010/0288125, the description of which can be referred to. It is in particular tris(2-hydroxyethyl)amine (triethanolamine, TEA), tris(2-hydroxypropyl) amine (triisopropanol), tributylethanolamine (TEA), bis(2-hydroxyethyl)methylamine (methyldiethanolamine, MDEA), 2-diethylaminoethanol (diethylethanolamine, DEEA), 2-dimethylaminoethanol (dimethylethanolamine DMEA), 3-dimethylamino-1-propanol, 3-diethylamino-1-propanol, 2-diisopropylaminoethanol (DIEA), N,N-bis(2-hydroxypropyl)methylamine or methyldiisopropanolamine (MDIPA).

Other examples of tertiary alkanolamines that can be used in the process according to the invention are given in U.S. Pat. No. 5,209,914, the description of which can be referred to, it is in particular N-methyldiethanolamine, triethanolamine, N-ethyldiethanolamine, 2-dimethylaminoethanol, 2-dimethylamino-1-propanol, 3-dimethylamino-1-propanol, 1-dimethylamino-2-propanol, N-methyl-N-ethylethanolamine, 2-diethylaminoethanol, 3-dimethylamino-1-butanol, 3-dimethylamino-2-butanol, N-methyl-N-isopropyl-ethanolamine, N-methyl-N-ethyl-3-amino-1-propanol, 4-dimethylamino-1-butanol, 4-dimethylamino-2-butanol, 3-dimethylamino-2-methyl-1-propanol, 1-dimethylamino-2-methyl-2-propanol, 2-dimethylamino-1-butanol and 2-dimethylamino-2-methyl-1-propanol.

Among the tertiary amines, there may also be mentioned the bis(tertiary diamines) such as N,N,N',N'-tetramethylethylenediamine, N,N-diethyl-N',N'-dimethylethylenediamine, N,N,N',N'-tetraethylethylenediamine, N,N,N',N'-tetramethyl-1,3-propanediamine (TMPDA), N,N,N',N'-tetraethyl-1,3-propanediamine (TEPDA), N,N-dimethyl-N',N'-diethylethylenediamine (DMDEEDA), 1-dimethylamino-2-dimethylaminoethoxy-ethane (bis[2-dimethylamino)ethyl] ether) mentioned in U.S. Patent Publication No. 2010/0288125.

In a preferred embodiment of the process according to the invention, the tertiary amine is selected from N-methyldiethanolamine (MDEA), triethanolamine (TEA), tributanolamine (TBA), and mixtures thereof. The tertiary amine which is the most preferred is N-methyldiethanolamine (MDEA). There is no limitation as regards to the primary or secondary amine of the absorbent solution used preferably as activator in the process according to the invention.

By "primary amine", within the meaning of the invention, is generally meant a compound comprising at least one primary amine function. Similarly, by "secondary amine", within the meaning of the invention, is generally meant a compound comprising at least one secondary amine function. This primary or secondary amine can be selected from the aliphatic, cyclic, aromatic or other amines. However, the primary or secondary amine used must generally be water-soluble at the concentrations used in the absorbent solution.

This primary or secondary amine can be for example aliphatic, cyclic or aromatic. Preferably, the primary amines are selected from the primary alkanolamines and the secondary amines are selected from the secondary alkanolamines. The secondary alkanolamines can be dialkanolamines, or alkylalkanolamines and the primary alkanolamines are monoalkanolamines. The alkyl groups and the hydroxyalkyl groups are as defined above.

Examples of activators that can be used in the process according to the invention have already been given above in the discussion of the prior art. Thus, examples of activators are given in U.S. Patent Publication No. 2008/0025893, namely 3-methylaminopropylamine (MAPA), piperazine, 2-methyl piperazine, N-methyl piperazine (NMP), homopiperazine, piperidine, and morpholine (MO). Other examples of activators that can be used in the process according to the invention are given in document WO-A1-2004/071624: these are piperazine, hydroxyethyl piperazine (HEP), and bis(hydroxyethyl) piperazine, and mixtures thereof.

Yet other examples of activators that can be used in the process according to the invention are given in U.S. Pat. Nos. 5,209,914, 5,277,885 and 5,348,714, they are polyamines such as dipropylenetriamine (DPTA), diethylenetriamine (DETA), triethylenetetramine (TETA) and tetraethylenepentamine (TEPA). Other activators mentioned in these documents and that can be used in the process according to the invention are aminoethylethanolamine (AEEA), hexamethylenediamine (HMDA), dimethylaminopropylamine (DMAPA) and 1,2-diaminocyclohexane (DACH), as well as methoxypropylamine (MOPA), ethoxypropylamine, aminoethylpiperazine (AEPZ), aminopropylpiperazine, aminoethylpiperidine (AEPD), aminopropylpiperidine, furfurylamine (FA) and ethylmonoethanolamine (EMEA). In a preferred embodiment, the activator is selected from monoethanolamine (MEA), butylethanolamine (BEA), diethanolamine (DEA), aminoethylethanolamine (AEEA), piperazine, hydroxyethyl piperazine (HEP), aminoethyl piperazine (AEP), and mixtures thereof.

Generally, the $C_2$ to $C_4$ thioalkanol has the formula: R—S—($C_2$-$C_4$alkylene)-OH, where R is any group, for example an alkyl group (generally $C_1$ to $C_6$) or an alkanol group (generally $C_1$ to $C_6$), or a thiol group, or an alkylthioalkanol group (generally $C_1$ to $C_6$). According to a preferred embodiment, the $C_2$ to $C_4$ thioalkanol is a dimeric molecule. An example of $C_2$ to $C_4$ thioalkanol that can be used according to the invention is ethylene dithioethanol of formula (HO—$CH_2$—$CH_2$)—S—($CH_2$—$CH_2$)—S—($CH_2$—$CH_2$—OH).

The preferred thioalkanol is ThioDiethylene Glycol or ThioDiGlycol (TDG), which is the compound of formula S($CH_2$—$CH_2$—OH)$_2$. Besides ethylenedithioethanol and TDG, other $C_2$-$C_4$ thioalkanols can also be used according to the invention, in particular methylthioethanol. A mixture of several thioalkanols can also be used.

It should be noted that another of the advantageous properties of the thioalkanols is that they have very low solubility in the higher hydrocarbons (ethane, propane, butane, etc.) that may be present in the gaseous mixture, such as natural gas. The thioalkanols are therefore only entrained to a very slight extent in the treatments downstream of the deacidification step.

It can be said that the invention uses a conventional absorption process but with a novel absorbent solution. A preferred absorbent solution is a solution constituted by water, MDEA, HEP and/or piperazine and TDG, in the respective proportions of 30%, 42%, 8%, and 20% by weight.

Advantageously, the contacting step is carried out at a temperature generally from 40° C. to 100° C., preferably from 50° C. to 90° C. and at a pressure from 1 to 150 bar, preferably from 10 to 70 bar. Advantageously, the purification process as described above further comprises, after the contacting step, a regeneration step of the laden absorbent solution with at least one acidic gas and optionally with at least one sulphur-containing compound. Advantageously, this regeneration step of the absorbent solution is carried out at a pressure from 0 to 20 bar, preferably from 1 to 3.5 bar, more preferably from 1 to 2 bar, and at a temperature from 100° C. to 140° C.

The invention further relates to an absorbent solution comprising, preferably constituted by:
  from 35% to 45% by weight of at least one tertiary amine relative to the total weight of the absorbent solution;
  from 4% to 12% by weight of at least one activator relative to the total weight of the absorbent solution; the total content of tertiary amine and activator being from 38% to 50% by weight relative to the total weight of the absorbent solution, the total concentration of tertiary amine and activator being comprised between 3.8 and 4.2 mol/L;
  from 17% to 25% by weight of at least one $C_2$ to $C_4$ thioalkanol relative to the total weight of the absorbent solution;
  the remainder being water to reach 100% by weight.

Preferably, the tertiary amine is selected from the tertiary alkanolamines. Advantageously, the tertiary amine is selected from N-methyldiethanolamine (MDEA), triethanolamine (TEA), tributanolamine (TBA), and mixtures thereof.

Advantageously, the activator is selected from the primary amines and the secondary amines, more preferably from the primary alkanolamines and the secondary alkanolamines. Preferably, the activator is selected from monoethanolamine (MEA), butylethanolamine (BEA), diethanolamine (DEA), aminoethylethanolamine (AEEA), piperazine, hydroxyethyl piperazine (HEP), aminoethyl piperazine (AEP) and mixtures thereof. Advantageously, the thioalkanol is ethylene dithioethanol or ThioDiGlycol (TDG).

A preferred absorbent solution is a solution constituted by water, MDEA, HEP and/or piperazine and TDG, in the respective proportions of 30%, 42%, 8%, and 20% by weight. The invention can be applied in any conventional unit of absorption and of regeneration using chemical absorbent solutions. Such a unit is in particular described in document WO-A1-2007/083012, the description of which can be referred to.

Any apparatus for gas-liquid or liquid-liquid contact can be used to carry out the contacting (absorption) step. In particular, any type of column can be used as the absorption column. It can in particular be a perforated-plate column, a valve column or a bulb-fractionating column. Columns with bulk or structured packing can also be used. Static in-line solvent mixers can also be used.

For the sake of simplicity, the terms "absorption column" or "column" are used hereinafter to denote the gas-liquid contact apparatus, but of course any apparatus for gas-liquid contact can be used to carry out the absorption step. Thus, the contacting (absorption) step can be carried out for example in an absorption column, generally under the conditions of temperature and pressure already stated above.

The absorption is carried out by contacting the gaseous mixture with the absorbent solution at a gaseous mixture flow rate generally from $0.23\times10^6$ $Nm^3$/day to $56\times10^6$ $Nm^3$/day and at a flow rate of absorbent solution generally from 800 to 50000 $m^3$/day. Advantageously, as already mentioned, the purification process as described above further comprises, at the end of the contacting step, a regeneration step of the adenabsorbent solution I with at least one acidic gas and optionally with at least one sulphur-containing compound. The regeneration step of the absorbent solution is applied conventionally by heating and separating at least one acidic gas, including $H_2S$, and optionally at least one sulphur-containing compound, in a regeneration column.

This regeneration step of the absorbent solution is generally carried out under the conditions of pressure and of temperature already stated above. In fact, the laden amine solution with at least one acidic gas, including $H_2S$, and optionally with at least one sulphur-containing compound; for example the laden amine solution with $H_2S$, $CO_2$ and the mercaptans RSH—called amine-rich—originating from the bottom of the absorption column is sent to an intermediate-pressure flash drum. The gases resulting from expansion of the amine-rich can be used as fuel gases, however, according to the invention, these gases, generally heavily laden with $H_2S$, are preferably treated, or optionally sent directly to a unit of the production of sulphur using the Claus reaction of controlled oxidation of the $H_2S$ or to a plant for synthesis of thio-organic compounds.

The amine-rich is then heated in an amine/amine exchanger by the hot amine from the bottom of the regenerator, and optionally partially vaporized and then recycled to feed the regeneration column. A reboiler generates steam, which ascends in counter-current in the column, entraining the acidic constituents such as $H_2S$ and $CO_2$ and optionally the mercaptans RSH. This desorption is promoted by the low pressure and high temperature prevailing in the regenerator.

At the top of the column, the acidic gases are cooled in a condenser. The condensed water is separated from the acidic gas in a reflux drum and returned either to the top of the regeneration column, or directly to the tank of amine-poor solution. The regenerated amine, which is therefore also called amine-poor, is then recycled to the absorption step. A semi-regenerated operating mode can also be envisaged. Thus, a fraction of the partially regenerated solvent taken from the intermediate flash drums or at an intermediate level of the regeneration column can be sent to an intermediate level of the absorption section.

EXAMPLES

The invention is described below, with reference to the following non-limitative examples given by way of illustration.

In the following examples, which illustrate the advantages of the invention, a gaseous mixture, which is a natural gas, saturated with water, containing among other things 5% by volume of $CO_2$, 5% by volume of $H_2S$, and 65 ppm by volume of mercaptans (50 ppm by volume of methyl mercaptan and 15 ppm by volume of ethyl mercaptan) is treated with aqueous absorbent solutions in view of removing the acidic gases. The composition of this gaseous mixture can be regarded as representative of the compositions of gaseous mixtures encountered in certain regions of the globe, in particular in Russia or the Middle East. These values are not regarded as being limitative or as constituting constraints for the implementation of the process. This treatment is carried out either with an absorbent solution of the prior art constituted by water, MDEA, and HEP in weight (comparative Example 1), or with an absorbent solution according to the invention constituted by water, MDEA, HEP and TDG, in the respective proportions of 30%, 42%, 8%, and 20% by weight.

The installation consists principally of a plate-type absorber, operating at 35 bar, and fed with a gas at 35° C. The laden solvent with acidic gases is then sent to the regeneration section. After a first expansion at 7 bar, the solvent is heated and then fed into a thermal regeneration column operating between 1.9 and 2.4 bar. The regenerated solvent is cooled, firstly by exchange with the rich solvent sent to thermal regeneration column, then secondly by means of air coolers. The cooled solvent is then pumped to the absorption column.

Example 1 (Comparative Example)

In this example, the gaseous mixture described above is treated with an absorbent solution of the prior art constituted by water, MDEA, and HEP in the respective proportions of 50%, 42%, and 8% by weight. A given flow rate of gas is treated, i.e. 13 000 kmol/h of crude gas. With an absorbent solution of the prior art constituted by water, MDEA, and HEP in the respective proportions of 50%, 42%, and 8% by weight, it is necessary to use 750 $Sm^3/h$ of solvent to remove the acidic gases, with specifications for $H_2S$ and $CO_2$ of 2 and 50 ppm respectively. The regeneration of this solvent requires an energy input of 53 MW.

Moreover, it is necessary to provide an additional step for the removal of the mercaptans, for example a step using molecular sieves, which make it possible to remove water and the mercaptans simultaneously. These sieves use 13% of the gas treated for their regeneration. In order to limit the production loss, an additional step must then be provided for treating this molecular sieve regeneration gas, in general by means of a specific solvent.

Example 2 (According to the Invention)

In this example, the gaseous mixture described above is treated with an absorbent solution according to the invention constituted by water, MDEA, HEP and TDG, in the respective proportions of 30%, 42%, 8%, and 20% by weight. A given flow rate of gas is treated, i.e. 13,000 kmol/h of crude gas.

The absorbent solution according to the invention, used in this example, makes it possible to reach the specifications for acidic gases in a single step, namely below 2 and 50 ppm of $H_2S$ and $CO_2$ in the treated gas, but also to remove 95% of the mercaptans, which corresponds to a content of the mercaptans in the treated gas below 5 ppm by volume. Accordingly, no additional treatment step is necessary to remove the mercaptans. Taking into account that the step of dehydration on molecular sieves is always necessary, the process according to the invention using the specific absorbent solution according to the invention makes it possible, however, to eliminate the additional step of treatment of the molecular sieve regeneration gas with a specific solvent.

The elimination of this additional step of treatment of the molecular sieve regeneration gas makes it possible to obtain a saving of 15% on the capital costs "CAPEX" of the units for removing the acidic gases and mercaptans. In addition, the absorbent solution used according to the invention also makes it possible to obtain a reduction in energy consumption of the deacidification unit relative to a deacidification unit using a conventional water-amine absorbent solution such as that used in Example 1. The saving observed is 7 MW, or 13%.

The invention claimed is:

1. A process for purifying a gaseous mixture containing at least one acidic gas selected from hydrogen sulphide $H_2S$ and carbon dioxide $CO_2$, comprising contacting the gaseous mixture with an absorbent solution comprising:

from 35% to 45% by weight of at least one tertiary amine relative to the total weight of the absorbent solution;
   from 4% to 8% by weight of at least one activator relative to the total weight of the absorbent solution, the total content of tertiary amine and activator being from 39% to 50% by weight relative to the total weight of the absorbent solution, and the total concentration of tertiary amine and activator being comprised between 3.8 and 4.2 mol/L;
   from 17% to 25% by weight of at least one $C_2$ to $C_4$ thioalkanol relative to the total weight of the absorbent solution; and
   the remainder being water to reach 100% by weight.

2. The process according to claim 1, in which the gaseous mixture contains, besides the at least one acidic gas, at least one sulphur-containing compound different from hydrogen sulphide $H_2S$.

3. The process according to claim 2, in which the at least one sulphur-containing compound is selected from mercaptans and carbonyl sulphide.

4. The process according to claim 3, wherein the content of the mercaptans in the gaseous mixture is from 10 ppm to 1000 ppm by volume, and further comprising lowering the content after the contacting step to 1 ppm by volume.

5. The process according to claim 3, wherein the COS content of the gaseous mixture is comprised between 5 ppm and 100 ppm by volume, and further comprising lowering the content after the contacting step to 2 ppm by volume.

6. The process according to claim 1, further comprising carrying out the contacting step at a temperature from 40° C. to 100° C., and at a pressure from 1 to 150 bar.

7. The process according to claim 1, further comprising, after the contacting step, regenerating the laden absorbent solution with at least one acidic gas.

8. The process according to claim 7, further comprising carrying out the regeneration step of the absorbent solution at a pressure from 0 to 20 bar, and at a temperature from 100° C. to 140° C.

9. The process according to claim 1, wherein the activator is selected from the group consisting of dipropylenetriamine (DPTA), diethylenetriamine (DETA), triethylenetetram ine (TETA), tetraethylenepentamine (TEPA), aminoethylethanolamine (AEEA), hexamethylenediamine (HMDA), dimethylaminopropylamine (DMAPA), 1,2-diaminocyclohexane (DACH), methoxypropylamine (MOPA), ethoxypropylamine, aminoethylpiperazine (AEPZ), aminopropylpiperazine, aminoethylpiperidine (AEPD), aminopropylpiperidine, furfurylamine (FA), ethylmonoethanolamine (EMEA), butylethanolamine (BEA), aminoethyl piperazine (AEP), and mixtures thereof.

10. The process according to claim 1, wherein the contacting comprises:
feeding the gaseous mixture into an absorption column operating at 35 bar and containing the absorbent solution; and
contacting the gaseous mixture with the absorbent solution in the absorption column to purify the gaseous mixture and to generate a laden absorbent solution,
and the process further comprises regenerating the absorbent solution from the laden absorbent solution in a regeneration section by:
subjecting the laden absorbent solution to a pressure of 7 bar;
heating the laden absorbent solution to a temperature of from 100° C. to 140° C.;
feeding the heated laden absorbent solution into a thermal regeneration column operating between 1.9 bar and 2.4 bar to yield heated regenerated absorbent solution;
cooling the heated regenerated absorbent solution by exchange with a rich solvent;
further cooling the heated regenerated absorbent solution with air coolers to yield regenerated absorbent solution; and
pumping the regenerated absorbent solution to the absorption column.

11. The process according to claim 1, wherein the gaseous mixture is selected from natural gases, tail gases obtained at the outlet of the sulphur chains, and the gases obtained in the gas treatment plants of a refinery.

12. The process according to claim 1, wherein the tertiary amine is selected from the tertiary alkanolamines.

13. The process according to claim 1, wherein the tertiary amine is selected from methyldiethanolamine (MDEA), triethanolamine (TEA), tributanolamine (TBA), and mixtures thereof.

14. The process according to claim 1, wherein the activator is selected from the primary amines, the secondary amines, the primary alkanolamines and the secondary alkanolamines.

15. The process according to claim 1, wherein the activator is selected from monoethanolamine (MEA), butylethanolamine (BEA), diethanolamine (DEA), aminoethylethanolamine (AEEA), piperazine, hydroxyethyl piperazine (HEP), aminoethyl piperazine (AEP), and mixtures thereof.

16. The process according to claim 1, wherein the thioalkanol is ethylene dithioethanol or ThioDiGlycol (TDG).

17. The process according to claim 1, wherein the absorbent solution comprises water, methyldiethanolamine (MDEA), hydroxyethyl piperazine (HEP) and/or piperazine and thiodiglycol (TDG), in the respective proportions of 30%, 42%, 8%, and 20% by weight.

18. The process according to claim 1, wherein the hydrogen sulphide content of the gaseous mixture is from 40 ppm by volume to 40% by volume, and further comprising lowering the content after the contacting step to 1 ppm by volume.

19. The process according to claim 1, wherein the $CO_2$ content of the gaseous mixture is from 0.2% by weight to 40% by volume, and further comprising lowering the content after the contacting step to 50 ppm by volume.

* * * * *